United States Patent [19]

Montagna

[11] 4,052,296
[45] Oct. 4, 1977

[54] HYDROGENATION PROCESS EMPLOYING A ZINC PROMOTED CATALYST

[75] Inventor: Angelo Anthony Montagna, Monroeville, Pa.

[73] Assignee: Gulf Research & Development Company, Pittsburgh, Pa.

[21] Appl. No.: 745,635

[22] Filed: Nov. 29, 1976

[51] Int. Cl.² .............................................. C10G 23/02
[52] U.S. Cl. ................................ 208/216; 208/254 H
[58] Field of Search .................... 208/143, 254 H, 216

[56] References Cited

U.S. PATENT DOCUMENTS

| 2,953,519 | 9/1960 | Bercik et al. | 208/143 |
| 2,967,820 | 1/1961 | Johnson et al. | 208/216 |
| 3,546,103 | 12/1970 | Hamner et al. | 208/216 |
| 3,627,674 | 12/1971 | Nagl | 208/216 |
| 3,649,525 | 3/1972 | Hilfman | 208/216 |
| 3,849,296 | 11/1974 | Hensley, Jr. | 208/216 |

Primary Examiner—George Crasanakis

[57] ABSTRACT

An improved hydrogenation process for the denitrification and desulfurization of hydrocarbons employing a catalyst consisting essentially of a Group VI-B metal, nickel and zinc composited with alumina.

8 Claims, 1 Drawing Figure

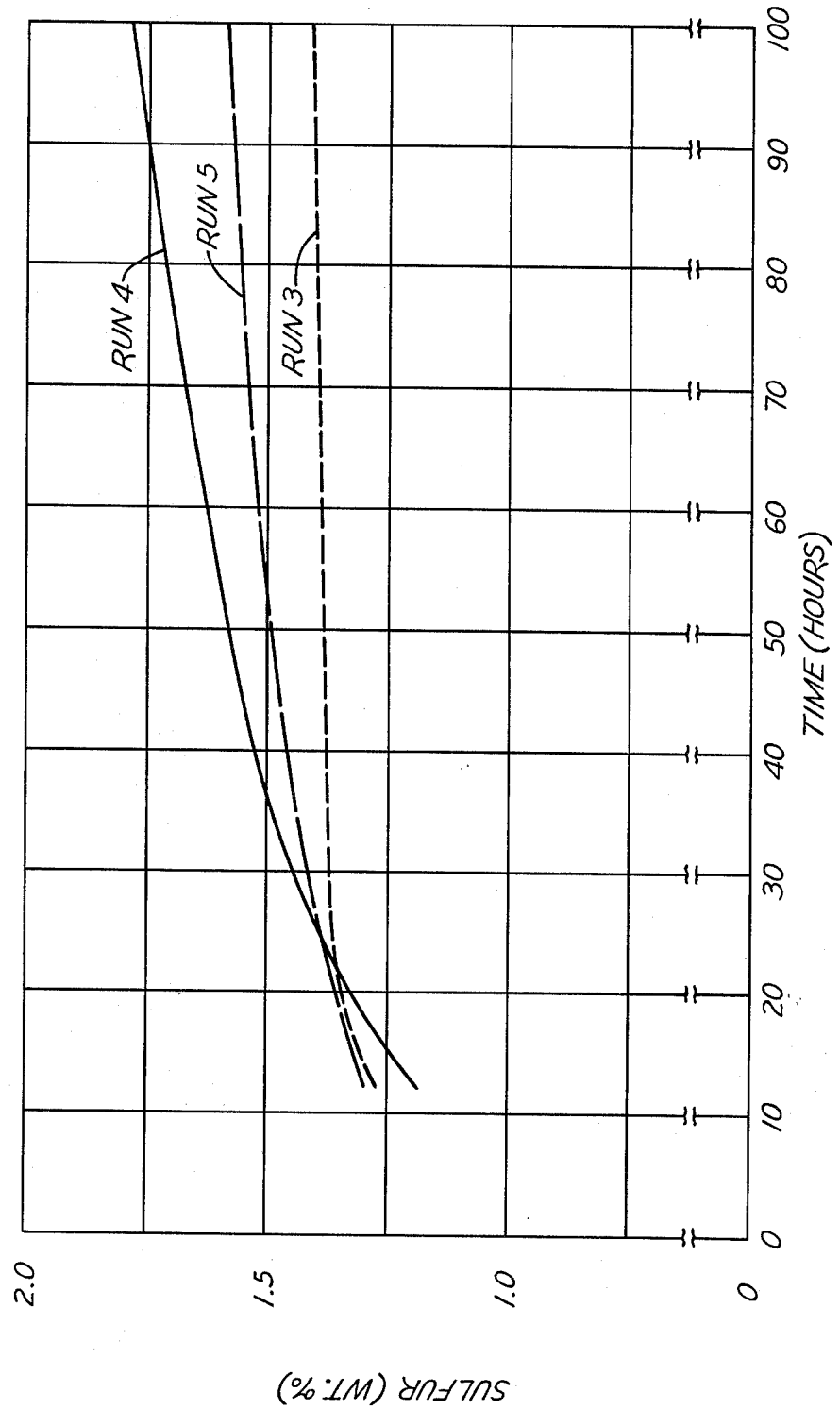

HYDROGENATION PROCESS EMPLOYING A ZINC PROMOTED CATALYST

BACKGROUND OF THE INVENTION

It is conventional in the art to effect denitrification and desulfurization of hydrocarbon stocks by subjecting them to treatment with hydrogen at elevated temperatures and pressures while in contact with a catalyst containing hydrogenating components, either supported or unsupported. Typical of the catalysts suggested by the prior art are those containing Group VI-B and Group VIII metals, or their oxides or sulfides, as the hydrogenating components, with such hydrogenating components being supported on a variety of well-known carriers, such as, for example, alumina, kieselguhr, zeolitic molecular sieves and other materials having high surface areas.

When such conventional catalysts are employed in the desulfurization of residual-containing hydrocarbon feed stocks, for example, it has been observed that the aging rate of the catalyst is high and as a result the catalyst mustbe replaced frequently. Therefore, it is desired that improved hydrogenation catalysts be obtained which when employed in denitrification and desulfurization processes will have excellent activity and wherein the aging rate of the catalysts are substantially reduced.

SUMMARY OF THE INVENTION

An improved hydrogenation process for the denitrification and desulfurization of naphtha and heavier liquid hydrocarbons is obtained by contacting the hydrocarbon feed in a hydrogenation zone with a catalyst in the presence of hydrogen at an elevated temperature and pressure, the catalyst being in sulfided form and consisting essentially of a Group VI-B metal, nickel and zinc composited with alumina.

DESCRIPTION OF THE DRAWING

FIG. 1 illustrates the inventive process as applied to the desulfurization of a reduced crude.

DESCRIPTION OF THE INVENTION

The carrier or support employed in the catalyst composition of this invention is alumina or a silica-stabilized alumina containing up to about 5 percent by weight based upon the carrier of silica, silica gels, acid leached boro-silicate glass, and spinels, e.g. magnesium aluminate. In addition to silica, the alumina should contain no more than 3 percent by weight of one or more of refractory metal oxides, other than alumina, such as, thoria, boria, titania, magnesia, zirconia, etc.

The hydrogenating components employed in the preparation of the catalyst composite of this invention comprise a combination of the Group VI-B metal and nickel with the atomic ratio of nickel to Group VI-B of at least 1:0.3 and preferably at a ratio of at least 1:1.0. Generally, catalysts with a nickel to Group VI-B atomic ratio in excess of about 1:5 are not employed and preferably those catalysts having an atomic ratio of 1:2.5 are utilized. Further, the catalyst composites have a total Group VI-B plus nickel metals content of at least about 5 percent by weight based upon the total catalyst and preferably at least about 8 percent by weight. Generally, catalysts containing more than 30 percent by weight of nickel and Group VI-B metals are not employed. Suitably, the catalyst composites of this invention can contain combinations of nickel and molybdenum, nickel and tungsten, or nickel, tungsten and molybdenum with nickel and molybdenum being the preferred combination.

The catalysts of this invention are promoted with zinc. Such catalysts contain at least 0.25 weight percent zinc based upon the total catalyst weight and preferably contain between 0.25 and about 5.0 weight percent of zinc. There does not appear to be any advantage to employing above 10 percent by weight of zinc. In the preparation of the catalyst composite, the support is initially contacted with the Group VI-B metal which, for example, can be deposited on the support from an aqueous solution of a salt such as ammonium molybdate, ammonium paramolybdate, molybdenum pentachloride, or molybdenum oxalate. After drying, the impregnated catalyst can then be conventionally calcined to convert the deposited molybdate salt to the oxide.

The support containing the Group VI-B metal can then be contacted with an aqueous solution of a nickel salt followed by drying and calcination. Nickel nitrate or nickel acetate is normally utilized although any water soluble salt which leaves no harmful residue can be employed. If desired, nickel and the Group VI-B metal can be deposited simultaneously on the support, but are preferably deposited on the support in the sequence outlined above with intervening drying and calcination.

After depositing the Group VI-B metal on the support, zinc can be deposited on the support from an aqueous solution of a zinc salt. Suitable zinc salts which can be utilized in preparing the catalyst salts include $Zn(NO_3)_2 \cdot 6H_2O$, $ZnCl_2$, $Zn(OH)_2$, $Zn(C_2H_3O_2)_2$, $ZnF_2$, $ZnF_2 \cdot 4H_2O$, $Zn(NO_3)_2 \cdot 3H_2O$. Following deposition of the zinc on the carrier, the catalyst containing the zinc can then be subjected to conventional drying and calcination. The deposition of zinc on the support can precede or follow deposition of the nickel. Alternatively, nickel and zinc can be deposited simultaneously from a single solution on the support containing the Group VI-B metal.

The hydrogenation components of the prepared catalyst composite are employed in the sulfided form. The catalyst can be presulfided after calcination, or after calcination and reduction by methods known in the art. For example, the presulfiding can be conducted by employing a hydrogen sulfide and hydrogen gaseous mixture at a temperature in the range of 500° to 700° F. (261° to 372° C.) and at an elevated pressure. Presulfiding can be conveniently effected at the beginning of an onstream period at the same conditions to be employed during the desulfurization process. The exact proportions of hydrogen and hydrogen sulfide are not critical. Additionally, presulfiding of the catalyst can be accomplished by employing a mercaptan or carbon disulfide utilizing methods known in the art.

The feed stocks suitable for employment in the hydrogenation process of this invention include all naphtha and heavier liquid hydrocarbons. The feed stocks particularly suitable are those containing a substantial quantity of components, i.e., greater than 50% by volume, boiling above about 400° F. (204° C.). Such materials can be synthetic crude oils such as derived from shale oil, tar sands and coal or full petroleum crudes or any individual fractions thereof. Thus, for example, our feed stock can be an atmospheric topped crude or it can be a vacuum residual fraction boiling substantially above 950° F. (510° C.). Similarly, it can be a naphtha or any of the intermediate distillate fractions, such as, a furnace oil. The inventive process is particularly applicable to a feed stock containing a substantial quantity of residual components, asphaltic contaminants and metalliferous components.

In the hydrogenation process, the feed stock is brought into contact with the above-defined catalyst composition maintained in a hydrogenation zone operated at a temperature in the range from about 500° to about 1,000° F. (260° to 538° C.), preferably in the range from about 550 to about 800° F. (288° to 427° C.). The space velocity maintained in the hydrogenation zone can be in the range from about 0.10 volumes of feed stock per volume of catalyst per hour and preferably in the range from about 0.3 to about 5.0. Contact between the catalyst composition and the feed stock is conducted in the presence of a hydrogen feed rate (hydrogen stream can range from 60 to 100 volume percent hydrogen purity) of from about 500 to about 10,000 standard cubic feet per barrel of feed stock (14,160 to 283,200 liters per 159 liters of feed stock), and preferably at a hydrogen flow rate in the range from 1,000 to about 8,000 standard cubic feet per barrel (17.8 to 142.4 SCM/100 L).

The pressure employed in the hydrogenation process can be in the range from about 100 to about 10,000 psig (7.00 to 700 kg/cm$^2$). When treating a distillate feed stock, i.e., a feed stock containing substantially no residual components, preferably a pressure in the range from about 200 to about 3,000 psig (14.00 to 210 kg/cm$^2$) is employed. When treating a residual-containing stock, such as, for example, a reduced crude (atmospheric tower bottoms) or a residual stock boiling above about 950° F. (510° C.), pressures in the range from about 250 to about 2,500 psig (17.6 to 176 kg/cm$^2$) are preferred.

When employed in the denitrogenation of hydrocarbon feed stocks, preferred process conditions include a pressure in the range of 200 to 3,500 psig (14.00 to 245 kg/cm$^2$), a temperature in the range of 550° to 800° F. (288° to 427° C.), a liquid hourly space velocity in the range of 0.3 to 5.0 and a hydrogen circulation rate in the range of 1,000 to 8,000 standard cubic feet per barrel (17.8 to 142.4 SCM/100 L). Preferred naphtha hydrogenation conditions comprise a pressure in the range of 100 to 400 psig (7.00 to 28.00 kg/cm$^2$), a temperature in the range of 550° to 700° F. (288° to 371° C.), a liquid hourly space velocity in the range of 4.0 to 8.0, and a hydrogen circulation rate in the range of 1,000 to 2,000 standard cubic feet per barrel (17.8 to 35.6 SCM/100 L).

Preferred distillate gas oil desulfurization process parameters to be employed in the inventive process of this invention include a pressure in the range of 400 to 1,500 psig (28.00 to 105 kg/cm$^2$), a temperature in the range of 600° to 780° F. (316° to 416° C.), a liquid hourly space velocity in the range of 0.7 to 5.0, and a hydrogen feed rate in the range of 500 to 2,000 standard cubic feet per barrel (8.9 to 35.6 SCM/100 L). Preferred residual hydrocarbon desulfurization conditions include a pressure in the range of 500 to 2,500 psig (35.00 to 175 kg/cm$^2$), a temperature in the range of 600° to 800° F. (316° to 427° C.), a liquid hourly space velocity in the range of 0.3 to 5, and a hydrogen circulation rate in the range of 1,000 to 8,000 standard cubic feet per barrel (17.8 to 142.4 SCM/100 L).

The following examples are presented to illustrate objects and advantages of the invention. It is not intended, however, that the invention should be limited to the specific embodiments presented therein.

EXAMPLE I

In this Example, a catalyst comprising 10.0 weight percent molybdenum, 3.0 weight percent nickel, and 1.0 weight percent zinc on an alumina support was prepared and the prepared catalyst employed in subsequent Examples II and III. In preparation of the catalyst, 600 cc of a commercially available alumina was calcined for 16 hours at 1,000° F. (538° C.). The weight of the calcined alumina was 332.20 grams and was further characterized as follows:

| | |
|---|---|
| Surface Area: M$^2$/gram | 326.1 |
| Pore Volume: cc/gram | 0.75 |
| Pore Volume Distribution (Nitrogen Adsorption): Vol. % | |
| 200 – 300  A (Radius) | 2.3 |
| 100 – 200 | 8.5 |
| 70 – 100 | 15.1 |
| 50 – 70 | 25.2 |
| 40 – 50 | 17.7 |
| 30 – 40 | 16.7 |
| 20 – 30 | 13.0 |
| 10 – 20 | 1.4 |

A first impregnation solution was prepared by dissolving 75.58 grams of ammonium paramolybdate and 33.0 cc of ammonium hydroxide in 390 cc of distilled water. The calcined alumina was contacted with this first impregnation solution by pouring the solution onto the alumina with continuous mixing. Following the first impregnation step, the catalyst was oven dried for 29 hours at 250° F. (121° C.). The oven dried catalyst was subsequently calcined for 16 hours at 1,000° F. (538° C.).

A second impregnation solution was prepared by dissolving 79.40 grams of Ni(NO$_3$)$_2$.6H$_2$O and 18.84 grams of Zn(NO$_3$)$_2$.6H$_2$O in 356 cc of distilled water. The oven dried and calcined molybdenum-containing alumina was contacted with this second impregnation solution by pouring the solution onto the support with continuous mixing. After this second impregnation, the catalyst was oven dried at 250° F. (121° C.) for 22 hours and then calcined at 1,000° F. (538° C.) for 16 hours. The weight of the final catalyst was 409.35 grams and contained 10 percent by weight molybdenum, 3.0 percent by weight nickel, and 1.0 weight percent zinc, based on the total catalyst, to provide a nickel to molybdenum atomic ratio of about 1:2.04. The prepared catalyst was further characterized as follows:

| | |
|---|---|
| Surface Area: M$^2$/gram | 156.3 |
| Pore Volume: cc/gram | 0.50 |
| Pore Volume Distribution (Nitrogen Adsorption): Vol. % | |
| 200 – 300  A (Radius) | 3.9 |
| 150 – 200 | 4.4 |
| 100 – 150 | 25.7 |
| 80 – 100 | 19.6 |
| 60 – 80 | 18.2 |
| 40 – 60 | 15.4 |
| 30 – 40 | 7.0 |
| 20 – 30 | 5.7 |
| 7 – 20 | 0.0 |

EXAMPLE II

In this Example the effectiveness of the catalyst composition of Example I in the denitrogenation and desulfurization of a petroleum gas oil is demonstrated. The hydrocarbon feed to the process run of this Example was characterized as follows:

| | |
|---|---|
| Density: Kg/cubic decimeters | 0.9095 |
| Sulfur: wt. % | 2.60 |
| Aniline Point: ASTM D611, ° C. | 79.1 |
| Nitrogen, wt. % | 0.069 |
| Distillation, ASTM D1160: ° F. | |
| End Point | 1011° F. (544° C) |
| 5% | 637° F. (336° C) |
| 10 | 682° F. (361° C) |
| 20 | 721° F. (383° C) |
| 30 | 750° F. (399° C) |
| 40 | 774° F. (412° C) |
| 50 | 810° F. (432° C) |
| 60 | 845° F. (452° C) |
| 70 | 887° F. (475° C) |
| 80 | 921° F. (494° C) |
| 90 | 961° F. (516° C) |
| 95 | 991° F. (533° C) |

In the hydrogenation run of this Example, the average reactor temperature wherein the feed was contacted with the catalyst containing in a fixed bed was 390° C. A liquid hourly space velocity of 1.98 and a reactor pressure of 5,520 KPA was maintained during the run. A gas circulation rate of 355.7 cubic meters per cubic meter was maintained during the run with a hydrogen content of the gas being 80.0 volume percent. Hydrogen consumption during the run was 75.2 cubic meters per cubic meter.

The product gas oil recovered during the run was characterized as follows:

| | |
|---|---|
| Density: Kg/cubic decimeters | 0.8811 |
| Sulfur: wt. % | 0.19 |
| Aniline Point: ASTM D611, ° C. | 79.7 |
| Nitrogen, wt. % | 0.044 |
| Distillation, ASTM D1160: ° F. | |
| End Point | 1000° F. (538° C) |
| 5% | 555° F. (291° C) |
| 10 | 630° F. (332° C) |
| 20 | 684° F. (362° C) |
| 30 | 716° F. (380° C) |
| 40 | 751° F. (399° C) |
| 50 | 767° F. (408° C) |
| 60 | 809° F. (432° C) |
| 70 | 843° F. (451° C) |
| 80 | 882° F. (472° C) |
| 90 | 933° F. (501° C) |
| 95 | 958° F. (514° C) |

From the above, it can be determined that 92.7 weight percent of the sulfur was removed during the run and that the hydrogenation process was effective to remove 36.3 weight percent of the nitrogen.

EXAMPLE III

In this Example the effectiveness of the catalyst composition of Example I in the desulfurization of a Kuwait atmospheric tower bottoms (53.0 volume percent of crude) characterized as follows is demonstrated:

Gravity: °API 16.8
Sulfur: wt. % 3.76
$C_5$ insolubles: wt. % 6.90
Nickel: ppm 14
Vanadium: ppm 47

In the hydrogenation run of this Example, the average reactor temperature wherein the feed was contacted with the catalyst contained in a fixed catalyst bed was adjusted to maintain a liquid product sulfur of 1% by weight. A liquid hourly space velocity of 1.0 and a reactor pressure of 2,000 psig (140.00 kg/cm²) was maintained during the run. A gas circulation rate of 5,000 standard cubic feet of hydrogen per barrel of feed through the reactor was maintained during the run.

The desulfurized residual petroleum fraction recovered after 1003 hours of operation when the bed temperature had leveled-off at 732° F. (389° C.) was characterized as follows:

Gravity: °API 22.1
Sulfur: wt. % 1.06
$C_5$ insolubles: wt. % 1.87
Nickel: ppm 4.3
Vanadium: ppm 6.1

EXAMPLE IV

In this Example the criticality of employing the particular catalyst composition of this invention in the desulfurization of the Kuwait atmospheric tower bottoms feed stock of Example III is demonstrated. In the first run of this Example (Run No. 3) a catalyst comprising 3.0 weight percent nickel, 3.0 weight percent zinc, and 8.0 weight percent molybdenum on alumina was utilized. In the second run (Run No. 4) a catalyst comprising 3.0 weight percent zinc, 3.0 weight percent cobalt, and 8.0 weight percent molybdenum on the alumina support of Run No. 3 was employed. Each of the catalysts of Runs 3 and 4 was prepared by the method described in Example I with the exception that cobalt nitrate was employed in the catalyst of Run No. 4 in place of the nickel nitrate. The catalyst composite employed in each of Runs 3 and 4 was characterized as follows:

| | Catalyst of Run No. 3 | Catalyst of Run No. 4 |
|---|---|---|
| Surface Area: m²/g | 154.8 | 150.9 |
| Pore Volume: Cubic decimeter/kilograms | 0.58 | 0.50 |
| Average Pore Radius: A | 74.6 | 64.8 |
| Pore Volume Distribution (Nitrogen Adsorption): Vol % | | |
| 200 – 300 A | 2.0 | 4.8 |
| 100 – 200 | 30.5 | 35.4 |
| 90 – 100 | 9.8 | 8.0 |
| 80 – 90 | 11.7 | 9.4 |
| 70 – 80 | 10.9 | 8.9 |
| 60 – 70 | 10.6 | 8.6 |
| 50 – 60 | 8.3 | 6.6 |
| 40 – 50 | 8.1 | 6.8 |
| 30 – 40 | 6.2 | 6.1 |
| 20 – 30 | 1.9 | 5.4 |

Each of the catalysts was employed in the desulfurization of the Kuwait atmospheric tower bottoms feed stock employing the desulfurization process parameters of Example III. The results of each of the runs are presented in attached FIG. 1.

After 50 hours of operation the liquid product recovered from the hydrodesulfurization zone in Run No. 3 contained 1.37 weight percent sulfur and after 100 hours of operation the liquid product contained 1.42 weight percent sulfur. After 50 hours of operation the liquid product of Run No. 4 contained 1.60 weight percent sulfur and after 100 hours of operation the liquid product contained 1.78 weight percent sulfur. From a comparison of the two runs, the criticality of employing nickel rather than cobalt in the catalyst composition is demonstrated by an improvement in catalyst activity as shown by the difference between 1.78 and 1.42 weight percent sulfur in the products after 100 hours.

In Run No. 5 a catalyst comprising 0.5 weight percent nickel, 1.0 weight percent cobalt, and 8.0 weight percent molybdenum on alumina was employed in the desulfurization of the Kuwait atmospheric tower bottoms feed stock of Runs 3 and 4. Hydrodesulfurization process conditions as employed in Run 3 and 4 was also utilized in Run No. 5. The results are shown in the attached FIG. 1. A comparison of Runs 3 and 5 demonstrates the criticality of employing zinc as a promoter in the hydrodesulfurization catalyst. After 50 hours of operation, the product of Run No. 5 contains 1.5 weight percent sulfur and after 100 hours of operation the sulfur content of the product of Run No. 5 was 1.59 weight percent.

Although the invention has been described with reference to specific embodiments, references, and details, various modifications and changes will be apparent to one skilled in the art and are contemplated to be embraced in this invention.

I claim:

1. A process which comprises contacting a hydrocarbon feed selected from the group consisting of naphtha and heavier liquid hydrocarbons with a catalyst in a hydrogenation zone under hydrogenation conditions to separate sulfur and nitrogen from said hydrocarbon feed, said catalyst consisting essentially of a Group VI-B metal, nickel and zinc supported on alumina or a silica-stabilized alumina, the Group VI-B metal and nickel being in the sulfided form, and recovering a hydrogenated hydrocarbon product from said hydrogenation zone.

2. The process of claim 1 wherein said Group VI-B metal comprises molybdenum.

3. The process of claim 1 wherein said hydrogenation conditions include a temperature in the range from about 500° to about 1,000° F., a pressure in the range from about 100 to about 10,000 psig, a hydrogen feed rate in the range of about 500 to about 10,000 standard cubic feet per barrel of hydrocarbon feed, and a space velocity in the range from about 0.10 to about 10.0 volumes of feed stock per volume of catalyst per hour.

4. The process of claim 3 wherein the concentration of zinc is in the range between 0.25 and about 5.0 weight percent of said catalyst.

5. The process of claim 1 wherein said hydrogenation conditions include a pressure in the range of 200 to 3,500 psig, a liquid hourly space velocity in the range of 0.3 to 5.0, a temperature in the range of 550° to 800° F., and hydrogen circulation rate in the range of 1,000 to 8,000 standard cubic feet per barrel of hydrocarbon feed, and wherein the hydrogenated product recovered from said hydrogenation zone contains substantially less nitrogen.

6. The process of claim 1 wherein said hydrocarbon feed comprises naphtha and said hydrogenation conditions include a pressure in the range of 100 to 400 psig, a temperature in the range of 550° to 700° F., a liquid hourly space velocity in the range of 4.0 to 8.0, and a hydrogen circulation rate in the range of 1,000 to 2,000 standard cubic feet per barrel of hydrocarbon feed.

7. A process for the hydrodesulfurization of a sulfur-containing gas oil feed which comprises contacting said gas oil with hydrogen and a catalyst consisting essentially of a Group VI-B metal and nickel supported on alumina, said catalyst being promoted with from about 0.25 to about 5 weight percent of zinc, said Group VI-B metal and nickel being in the sulfided form, said contacting being conducted at a temperature from about 600° F. to about 780° F., at a pressure from about 400 to about 1500 psig, at a liquid hourly space velocity from about 0.7 to about 5.0 volumes of the gas oil feed per volume of catalyst per hour and at a hydrogen feed rate from about 500 to about 2,000 standard cubic feet of hydrogen per barrel of gas oil feed, and recovering therefrom a desulfurized gas oil product.

8. A process for the hydrodesulfurization of a sulfur-containing residual hydrocarbon feed which comprises contacting said residual hydrocarbon feed with hydrogen and a catalyst consisting essentially of a Group VI-B metal and nickel, the Group VI-B metal and nickel being in the sulfided form, supported on alumina, said catalyst being promoted with from about 0.65 to about 5 weight percent of zinc, said contacting being conducted at a temperature in the range of 600° to 800° F., at a pressure from about 500 to 2,500 psig, at a liquid hourly space velocity from about 0.3 to about 5 volumes of residual hydrocarbon feed per volume of catalyst per hour and at a hydrogen circulation rate from about 1,000 to about 8,000 standard cubic feet of hydrogen per barrel of residual hydrocarbon feed, and recovering therefrom a desulfurized residual hydrocarbon product.

* * * * *